United States Patent [19]

Riley

[11] 4,454,405

[45] Jun. 12, 1984

[54] WELDING PROCESS AND APPARATUS

[76] Inventor: Thomas C. Riley, 286B Grant St., Salem, N.J. 08079

[21] Appl. No.: 415,400

[22] Filed: Sep. 7, 1982

[51] Int. Cl.³ ........................ B23K 9/00; B23K 31/06
[52] U.S. Cl. .................................... 219/61; 219/60 R
[58] Field of Search ............... 219/61, 60 R, 59.1, 219/61.2; 222/3, 566, 568, 489; 261/19, 44 E, 29 R; 239/DIG. 13, 533.1

[56] References Cited

U.S. PATENT DOCUMENTS

| | | | |
|---|---|---|---|
| 2,716,691 | 8/1955 | Bowman | 219/61 |
| 3,495,066 | 2/1970 | Broyard et al. | 219/74 |
| 3,614,378 | 10/1971 | Goodell | 219/61 X |
| 4,395,614 | 7/1983 | Weil et al. | 219/64 |

*Primary Examiner*—B. A. Reynolds
*Assistant Examiner*—Catherine M. Sigda
*Attorney, Agent, or Firm*—E. Barron Batchelder

[57] ABSTRACT

In a welding procedure for joining of adjacent, possibly partially enclosed metal components, such as pipe sections, wherein the welding procedure can be of a gas tungsten arc type such as a heli-arc type, or similar process, and wherein oxidation of metal frequently occurs within the components at the joinder point due to presence of oxygen in the region of weld during the welding procedure; introducing under pressure and at least initially pressure blowing, at a relatively high pressure, an inert gas into the interior of the components in a substantial swirling and interior surface wiping motion. The inert gas is blown through the components, from the entry end, beyond the weld region to rapidly, and substantially completely remove from the interior and weld region, any oxygen or other possible deleterious gas or material. Subsequently a lower pressure introduction of gas will serve to maintain the interior free of oxygen and the like. This procedure permits a clean, rapid welding of the elements in the absence of a build-up of undesired metal at the weld or juncture point, or undesired disturbance of the weld puddle which could cause defects in the weld.

8 Claims, 6 Drawing Figures

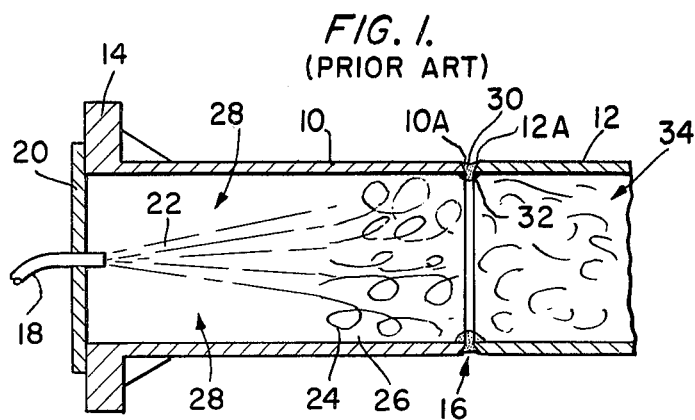
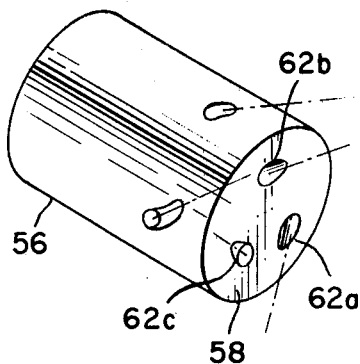
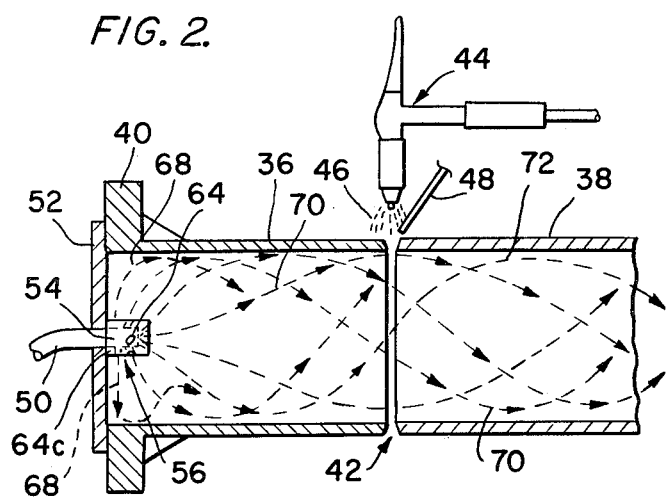
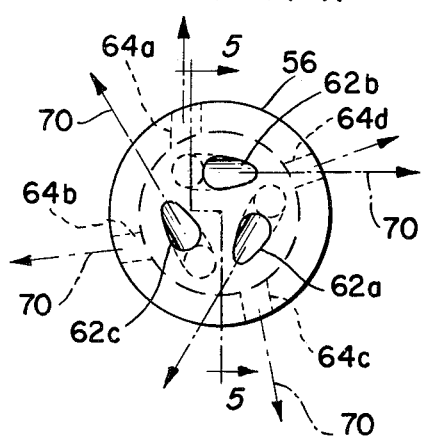
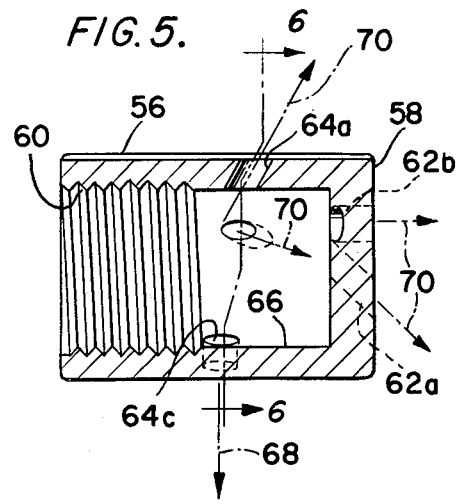
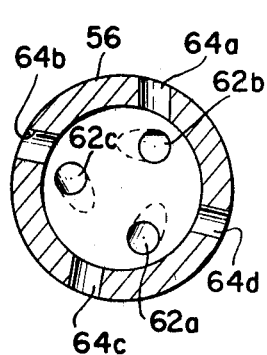

WELDING PROCESS AND APPARATUS

The invention broadly relates to joinder of two abutting sections of metal such as pipe by a gas metal arc, gas tungsten arc or heli-arc process while preventing an undesired metal oxide build-up on the inside of a pipe, for example, at the weld point. Other similar welding procedures are also contemplated.

The metal being welded, and preferably adjoining sections of pipe, can be of stainless steel or other exotic type metals such as carbon-steel, Hasteloy, Inconl, Monel or similar materials. When welding such materials the heat created by the welding procedure will normally, due to high temperatures involved, melt the material of the pipe sections and/or added stick weld material. The heat and melting penetrates through the material, and tends to cause an accumulation of oxidized metal material on the interior of the pipe due to oxygen or can affect the weld puddle in an undesirable manner. This frequently results in a possibly inferior weld and/or a disruption of a smooth interior pipe surface.

The present invention is directed to overcoming these problems heretofore encountered.

While the problems have long been in existence and understood, there has not been a satisfactory solution developed. As examples of prior art attempts to overcome the problems, several proposals have been advanced and U.S. patents have issued on the processes and apparatus. These prior patents which constitute prior art and which are incorporated herein by reference include the following:

W. R. Ramsaur U.S. Pat. No. 2,177,995; Oct. 31, 1939
R. T. Pursell U.S. Pat. No. 2,819,517; Jan. 14, 1958
E. W. Williams et al U.S. Pat. No. 2,874,263; Feb. 17, 1959
T. McElrath et al U.S. Pat. No. 2,905,805; Sept. 22, 1959

While other methods and procedures have been attempted, none have been completely satisfactory.

SUMMARY OF THE INVENTION

The present invention accordingly is broadly directed to a welding process and apparatus for welding of adjoining or adjacent pieces or sections of metal, such as metal pipe, wherein a flow of inert gas is introduced into an end of the pipe under substantial pressure initially and in such a manner, by a particular apparatus structure, as to create a high pressure swirling of the inert gas in the interior of the pipe with a resultant interior surface wiping motion.

The inert gas is blown through the pipe interior and exits therefrom. The action of the inert gas serves to rapidly and substantially completely remove from the interior of the pipe, and primarily the weld region, any oxygen or other possible deleterious gas or material. This permits a clean and rapid welding of the elements in the absence of a build-up of oxidized metal interiorally of the pipe at the weld or juncture point. A disturbance of the weld puddle, which could also create problems and perhaps inferior welds, is likewise eliminated by the present process.

The process is primarily usable in connection with stainless steel pipes or piping consisting of what is known in the art as exotic metals, and wherein the welding is effected by a type such as a gas metal arc, or gas tungsten arc, and the like, which normally results in the material of the pipe, and/or a weld rod if used, melting and a resultant penetration of the melted material from the exterior to the interior can take place. In the presence of oxygen in the pipe interior there is a strong likelihood of formation of oxidized metal. This is undesirable and the present invention eliminates this possibility.

Following an initial insertion of the inert gas under relatively high pressure and following an interior cleaning action, a continued flow of inert gas can take place to eliminate areas of low or back pressure which can result in undesirable interior pressure conditions.

It is a principle object of the present invention accordingly to improve welding procedures and techniques, particularly as applied to partially closed sections of metal being butt welded, such as pipe sections, and to eliminate problems caused by the presence of oxygen and other deleterious gases and/or materials within the pipe sections.

In accomplishing the new and improved end results of the invention, inert gas is introduced into the interior of the pipes by means of a nozzle having a plurality of exhaust holes or openings therein so arranged as to introduce the inert gas in a swirling or vortical type of flow serving to wipe the interior surface of the pipe and exhaust deleterious gases and/or materials from the pipe, and particularly at the point of welding juncture. The nozzle also includes one or more openings which will serve to remove such gas or material from the area or region of introduction of the inert gas, i.e., from the introduction end of the pipe.

The apparatus and procedure subsequent to initial high pressure introduction of inert gas is then subsequently controlled to maintain an idealized welding condition within the pipe sections.

Still other objects and advantages of the present invention will become readily apparent to those skilled in the art from the following detailed description of an embodiment of the invention, wherein there is shown and described only a preferred embodiment of the invention. The disclosure is simply by way of illustration of a best mode contemplated currently for carrying out the invention.

As will be realized, the invention is capable of other and specific embodiments and procedures, and such modifications are to be considered as within the scope of the invention. Accordingly, the drawings and description are to be regarded merely as illustrative in nature, and not as restrictive.

BRIEF DESCRIPTION OF THE DRAWINGS

FIG. 1 is a fragmentary, partially sectional view through two pipe sections to be welded, and disclosing a heretofore known method of introduction of an inert gaseous material into the pipe interior in an effort to cleanse the pipe interior of deleterious gases;

FIG. 2 is a view similar to FIG. 1 but disclosing the present inventive concept and apparatus for accomplishing the same, wherein inert gas is introduced in a manner to substantially thoroughly and rapidly cleanse the pipe interior by a swirling action of inert gas introduced therein;

FIG. 3 is a perspective view of a nozzle according to the invention for introduction of the inert gas into the pipe interior and adapted for attachment to a gas medium introduction pipe as shown in FIG. 2, the angular orientation of various of gas outflow openings in the nozzle being indicated by broken lines;

FIG. 4 is an end view of the nozzle of FIG. 3, further disclosing in dotted lines the outflow openings in the nozzle body below the end thereof, with the outflows therefrom being shown by arrows;

FIG. 5 is a sectional view taken on the staggered section line 5—5 of FIG. 4 and disclosing in greater detail the nozzle construction and inert gas outflow therefrom; and FIG. 6 is a sectional view taken on the staggered line 6—6 of FIG. 5.

DETAILED DESCRIPTION OF THE PREFERRED EMBODIMENT

Referring now in detail to the drawings, FIG. 1 discloses a prior art method of welding including an attempt to evacuate or purge the interior of adjoining pipe sections to be welded of oxygen or the like. The two pipe sections are generally designated 10 and 12, respectively. It will be noted that the adjacent pipe ends are slightly beveled at 10a and 12a, as commonly used in the art for facilitating the welding together of the sections. Weld neck flanges are normally used and in FIG. 1 a weld neck flange 14 is shown affixed to one end of pipe section 10. A point of butt weld juncture between pipe sections 10 and 12 is generally designated at 16. In the known, old process, a hose or tube 18 is inserted through an opening in a cap plate 20. An inert gas such as nitrogen or argon or the like is passed through tube 18 and exits, as indicated at 22, into the interior of pipe section 10. The inert gas as so inserted has a tendency to roll on the interior walls of the pipe as indicated by swirls such as at 24. This results in a pressing of air, including oxygen, in the interior of the pipe against the walls and can result in leaving small areas or sections such as at 26 of air trapped in the pipe. It is also to be noted that when utilizing the prior art method as shown in FIG. 1, there are regions of trapped air at 28 behind the effective portions of the inert gas flow. In the old attempt to purge air from a pipe, since it leaves trapped air in the pipe, there are bits or small amounts of air mixed with the incoming inert gas. This trapped air and resultant action will affect a weld puddle generally indicated at 30, and since the pipe material and/or material of a filler rod will tend to flow to the interior of the pipe at the weld juncture, can result in creation of oxidized metal as schematically indicated at 32.

When utilizing the old method of attempting to purge a pipe, the introduction of the inert gas as shown at 22 must run for a substantial period of time with a resultant expenditure of money in time and gas consumption. Furthermore, the inert gas, such as argon or nitrogen, is a heavy gas and will tend to fall away from the pipe interior due to gravity in an area as at 34 and this occurrence can take place in other areas. This tendency of the inert gas to fall away from contact with the interior of the pipe is the result of inertia and the heavy gas used. It will accordingly be seen that, especially in the weld area, there is a possibility of inferior welding and/or the creation of undesirable metal oxide build ups.

These drawbacks in the prior art are overcome by the present invention. Referring initially to FIG. 2, two free pipe sections 36 and 38 are shown in adjacent or abutting conditions, and are to be welded by means of a heli-arc, tungsten gas arc or metal gas arc welding technique. Pipe section 36 includes a weld neck flange 40 and adjacent ends of pipe sections 36, 38 are again bevelled as generally indicated at 42. A welding torch of an appropriate type is shown at 44. As is normal in this type of welding procedure, a flow of inert gas at 46 is used for cooling and to maintain tungsten, or metal filler rod 48 material, from excessively high and injurious temperatures. Such procedures are well known in the art.

The present invention departs from the prior art in the manner of insertion of inert gas into the interior of the pipe. Again referring to FIG. 2, a hose or tube 50 passes through cap 52 and a flow of inert gas under pressure is run or passed through the tube 50. Mounted on inner end 54 of the tube, within the pipe section 36, is a cap or purge device generally designated 56. Preferably, as shown in FIGS. 3 and 5, the inner end of the cap 56 has a closed end 58, and the cap can be internally threaded at 60 for attachment to the tube 50 in an obvious manner.

This cap or purge device 56 has a plurality of gas flow openings or holes therethrough as shown in FIGS. 2-6 inclusive of the drawings. As shown in the drawings, the closed end 58 has three holes or openings 62a, 62b and 62c passing therethrough. These holes are drilled at diverging angles and spaced from the longitudinal axis of the cap, and as shown, at an upward angle of approximately 30° to 40° from a longitudinal plane passing through the axis. A greater or lesser number of holes, and of varied positionment, can be incorporated, and the exact angle at which drilled can vary somewhat so long as they will accomplish the desired end result to be hereinafter discussed. The holes therefore are outwardly spaced from the central longitudinal axis and are not drilled as, or along, radii extending from the central axis. The arrangement is such as to cause a swirling or vortical motion to the inert gas exiting through these end holes, and directed toward the welding location and the exit end of the pipe sections. This action is hereinafter further described.

In addition to the end holes, a plurality of holes or openings are formed through the sidewall of the cap. As shown, there are four openings 64a, 64b, 64c and 64d. The holes 64a, 64c and 64d can all be drilled at the same angle, though not necessarily, with respect to the longitudinal axis of the cap, and most are in an upward inclination toward the closed end 58 of the cap. The number of holes can also vary, as may be functionally desireable. Three of the holes 64a, 64b and 64d, as shown, are drilled at a non-radial angle with respect to the central longitudinal axis and are so formed and disposed that inert gas exiting therefrom will take a similar swirling or vortical motion as that exiting from the end holes. All the inert gas exiting from all the holes will tend to operatively merge or join in this action, and tend to fill the pipe sections interiors with a swirling or vortical flow of inert gas moving toward the exit end, and additionally to cause a wiping action along the interior pipe surfaces or faces. The remaining hole 64c in the sidewall, while having the same angular disposition as the others through the side as to cause a swirling motion around the cap, is not drilled at an inclined angle toward the end of the cap. This hole 64c is at right angles to the longitudinal axis of the cap as shown in FIGS. 5 and 2. This positionment of opening 64c is to cause a flow of inert gas at right angles to the longitudinal axis of the cap and directly toward the interior sidewall 66 of the cap, serving to flush air from behind the nozzle as indicated by arrows 68. This flow additionally overcomes a low pressure gas area resulting from the forward flow from the other holes.

The inclination of the end and other side openings and their arrangement, will create a swirling or vortical flow of the inert gas, as indicated by arrows 70, the same numerical designation being applied to these currents or flow paths of the inert gas from the various holes which join in the swirling motion, and as shown at 72 in FIG. 2 will tend to wipe the interior surface 66 of any air thereon. The angular disposition of exited gas, when it hits the interior wall of the pipe, tends to bend the flow around in the swirling motion.

If desired, the holes can be drilled in a staggered manner so long as they are so aligned that gas flow from each will catch up to that from the others and cover the interior wall of the pipe.

The nozzle can be formed of heat resistant plastic since it is in a position where it will not be exposed to extreme welding heat.

With the substantially violent whirlwind or vortical action, heavy gas will not give way to gravity as quickly as it would with the old straight in method as shown in FIG. 1.

The sizes of the holes can vary, as also their number. As an example of a particular use, and as shown in the drawings, the pipe can be six inches in diameter, with the cap approximately ¼ inch thick, and the various holes or openings approximately 3/32 inches in diameter. Initially the inert gas will be inserted at a rate of approximately 60 cu. ft. per hour for a 10 foot pipe section, and thereafter reduced substantially to a range of about 20 cubic feet per section for a minimized flow through the pipe.

A closure cap at the far end of the pipe will be provided with a weep hole to permit flow of the inert gas to the exterior. In the embodiment shown, with the end of the pipe capped off and the nozzle as formed placed as shown, the inert gas being introduced would, as exited, be pointed in seven different directions at the same time.

The nozzle can have the holes drilled to point in a clockwise or counterclockwise direction and in use can cause a whirling or vortical flow pattern in pipes 2 to 24 inches in diameter, 30 feet long, and can bring gas purity up to 100% in 50% of the time required in the old method, with increased efficiency and maintain a more even blanket of inert gas against the interior wall surface of the pipe.

The structure, function and advantages of the present invention will be readily understandable from the foregoing description of a preferred embodiment when taken together with the drawings.

Many other possible variations in specifics of components or details of the invention will be apparent to those skilled in the art. While in the present disclosure, there is shown a preferred embodiment of the invention, it is to be understood that the invention is capable of changes or modifications without departing from the spirit and the scope of the inventive concept as expressed herein.

I claim:

1. In a welding procedure for joining adjacent pipe sections by gas arc welding, introducing and blowing an inert gas into the interior of the pipe sections in a substantially high swirling motion and against the interior surface in a wiping motion, the inert gas as so blown, passing from the entry ends, beyond a weld region, to rapidly and substantially completely remove from the pipe sections interior and weld region, any oxygen or deleterious gas or material to permit a clean, rapid welding of the pipe sections in the absence of a build-up of undesired oxidized metal at the weld juncture or any undesired disturbance of the weld pool.

2. In a welding procedure as claimed in claim 1, wherein the inert gas is initially introduced at a high velocity and subsequent to an initial purging, decreasing the velocity and volume to maintain a substantially air-free interior medium in the pipe sections during completion of a welding operation.

3. In a welding procedure as claimed in claim 2, wherein the flow of inert gas is directed at least in part substantially vertically toward the interior sidewall of a pipe section, and to a substantial degree at an outward angle to the longitudinal axis, and at an inclined angle from inlet end to outlet end of the pipe sections.

4. Apparatus for facilitating a welding of adjacent pipe sections including means for introduction of an inert gas material into the interior of the pipe sections to be joined by welding, the means including a nozzle mounted in the interior of a pipe section and affixed to a gas inlet tube, said nozzle having a closed end with a plurality of openings, said openings being outwardly spaced from, and disposed at an inclined angle to the longitudinal axis of the cap and pipe section and directed from inlet end to outlet end, and operable to create a swirling or vortical flow path to gas passing therethrough.

5. Apparatus as claimed in claim 4 wherein said openings in said nozzle end are inclined at a forward leading angle with respect to the longitudinal axis of the nozzle to instigate a forward vortical flow through the pipe sections.

6. Apparatus as claimed in claim 5, said openings being non-radial.

7. Apparatus as claimed in claim 6 wherein said nozzle additionally has a plurality of side openings formed in and through the side wall thereof, and wherein said side openings are disposed at an angle to the longitudinal axis of the nozzle and so disposed through the nozzle side wall as to create a swirling and forward flow path movement of the inert gas from entry to exit ends of said pipe sections and a wiping and cleansing action against the interior surfaces thereof.

8. Apparatus as claimed in claim 7, wherein at least one side opening in said nozzle is disposed at a substantial right angle inwardly with respect to the longitudinal axis of the nozzle and pipe to create a flow of inert gas behind the flow from the other said openings, said last mentioned hole being angularly disposed with respect to the longitudinal axis similar to the other side openings to create a swirling action, the combination flow from all said openings creating a cleansing wiping action against the interior of the pipe sections to be welded from the inlet entry position of the inert gas toward the opposite exit end of said pipe sections being welded.

* * * * *